(12) United States Patent
Endo

(10) Patent No.: US 11,245,328 B2
(45) Date of Patent: Feb. 8, 2022

(54) INTEGRATED CIRCUIT AND POWER SUPPLY CIRCUIT

(71) Applicant: FUJI ELECTRIC CO., LTD., Kawasaki (JP)

(72) Inventor: Yuta Endo, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/033,010

(22) Filed: Sep. 25, 2020

(65) Prior Publication Data

US 2021/0013797 A1     Jan. 14, 2021

Related U.S. Application Data

(63) Continuation of application No. PCT/JP2019/032981, filed on Aug. 23, 2019.

(30) Foreign Application Priority Data

Oct. 31, 2018   (JP) .............................. JP2018-205271

(51) Int. Cl.
    *H02M 1/42*      (2007.01)
    *H02M 3/335*      (2006.01)
    (Continued)

(52) U.S. Cl.
    CPC ........... *H02M 1/4225* (2013.01); *H02M 1/32* (2013.01); *H02M 3/335* (2013.01); *H02M 7/217* (2013.01); *H02M 1/0009* (2021.05)

(58) Field of Classification Search
    CPC ...... H02M 1/4225; H02M 1/425; H02M 1/42; H02M 1/32; H02M 1/0009; H02M 7/217;
(Continued)

(56) References Cited

U.S. PATENT DOCUMENTS 9,178,431 B2   11/2015   Chen
2005/0047052 A1   3/2005   Ueki et al.
(Continued)

FOREIGN PATENT DOCUMENTS

JP    H11-297483 A    10/1999
JP    2003-199348 A    7/2003
(Continued)

OTHER PUBLICATIONS

International Search Report for PCT/JP2019/032981, dated Nov. 5, 2019.
Written Opinion for PCT/JP2019/032981, dated Nov. 5, 2019.

*Primary Examiner* — Thienvu V Tran
*Assistant Examiner* — Shahzeb K Ahmad
(74) *Attorney, Agent, or Firm* — Rabin & Berdo, P.C.

(57) ABSTRACT

An integrated circuit for a power supply circuit that generates an output voltage at a target level from an AC voltage input thereto. The power supply circuit includes an inductor, and a transistor that controls a current flowing through the inductor. The integrated circuit drives the transistor based on the inductor current and the output voltage. The integrated circuit has a signal output circuit including a first comparator circuit comparing the inductor current and a predetermined current value, a timer circuit measuring a time elapsed since the value of the inductor current becomes smaller than the predetermined current value, and a second comparator circuit comparing the output voltage and a lower-than-target level. The signal output circuit indicates that the AC voltage is not input to a rectifier circuit, when the elapsed time reaches a predetermined time period and a level of the output voltage is lower than the lower-than-target level.

7 Claims, 7 Drawing Sheets

(51) Int. Cl.
*H02M 7/217* (2006.01)
*H02M 1/32* (2007.01)
*H02M 1/00* (2006.01)

(58) Field of Classification Search
CPC ........ H02M 7/062; H02M 7/12; H02M 7/155; H02M 7/162; H02M 3/335; Y02B 70/10
See application file for complete search history.

(56) References Cited

U.S. PATENT DOCUMENTS

| 2010/0110593 | A1* | 5/2010 | Kim | H02M 1/4225 |
| | | | | 361/18 |
| 2010/0165683 | A1 | 7/2010 | Sugawara | |
| 2011/0122664 | A1* | 5/2011 | Yabuzaki | H02M 1/32 |
| | | | | 363/53 |
| 2011/0170324 | A1* | 7/2011 | Hsieh | G05F 1/70 |
| | | | | 363/75 |
| 2012/0250381 | A1* | 10/2012 | Takahashi | H02M 1/4225 |
| | | | | 363/124 |
| 2014/0036561 | A1* | 2/2014 | Sakurai | H02M 7/06 |
| | | | | 363/126 |
| 2014/0085949 | A1 | 3/2014 | Sugawara | |
| 2016/0036249 | A1 | 2/2016 | Saji | |
| 2018/0198363 | A1 | 7/2018 | Watanabe | |

FOREIGN PATENT DOCUMENTS

| JP | 2006-223070 A | 8/2006 |
| JP | 2006-352976 A | 12/2006 |
| JP | 2010-154639 A | 7/2010 |
| JP | 2014-023194 A | 2/2014 |
| JP | 2014-082924 A | 5/2014 |
| JP | 2015-023722 A | 2/2015 |
| JP | 2015-035931 A | 2/2015 |
| JP | 2015-080317 A | 4/2015 |
| JP | 2015-122839 A | 7/2015 |
| JP | 2018-113175 A | 7/2018 |
| WO | 2014/188711 A1 | 11/2014 |
| WO | 2017/010031 A1 | 1/2017 |

* cited by examiner

US 11,245,328 B2

INTEGRATED CIRCUIT AND POWER SUPPLY CIRCUIT

CROSS-REFERENCE TO RELATED APPLICATIONS

This is a continuation application of International Patent Application No. PCT/JP2019/032981 filed Aug. 23, 2019, which claims the benefit of priority to Japanese Patent Application No. 2018-205271 filed Oct. 31, 2018. The full contents of the International Patent Application are incorporated herein by reference.

BACKGROUND

Technical Field

The present disclosure relates to an integrated circuit and a power supply circuit.

Description of the Related Art

An AC-DC converter generates an output voltage at a target level from an alternating current (AC) voltage, and generally, when the input AC voltage is interrupted, the output voltage drops. In such a case, a load of the AC-DC converter may not operate normally, and thus, a detection circuit that detects that the AC voltage has been interrupted may be provided to the AC-DC converter (for example, Japanese Patent Application Publication No. 2006-223070).

Incidentally, the detection circuit for detecting that the AC voltage has been interrupted is generally configured with a large number of discrete components, which increases the cost of the AC-DC converter.

The present disclosure has been achieved in light of such an issue described above, and an object thereof is to provide an integrated circuit capable of detecting that an AC voltage has been interrupted, at low cost.

SUMMARY

A primary aspect of the present disclosure for solving an issue described above is an integrated circuit for a power supply circuit that generates an output voltage at a target level from an alternating current (AC) voltage input thereto, the power supply circuit including a rectifier circuit that rectifies the AC voltage, an inductor that receives a rectified voltage from the rectifier circuit, and a transistor that controls an inductor current flowing through the inductor, the integrated circuit being configured to drive the transistor based on the inductor current and the output voltage, the integrated circuit comprising: a signal output circuit that includes a first comparator circuit that compares a value of the inductor current and a predetermined current value, a timer circuit that measures a time elapsed since the first comparator circuit starts to output a result of the comparison indicating that the value of the inductor current is smaller than the predetermined current value, and a second comparator circuit that compares a level of the output voltage and a first level lower than the target level, the signal output circuit outputting a first signal indicating that the AC voltage is not input to the rectifier circuit, when the elapsed time reaches a predetermined time period and the second comparator circuit outputs a result of the comparison thereof indicating that the level of the output voltage is lower than the first level.

According to the present disclosure, it is possible to provide an integrated circuit capable of detecting that an AC voltage has been interrupted, at low cost.

DETAILED DESCRIPTION

At least the following matters become apparent from the description of the present specification and the accompanying drawings.

Embodiment of Present Disclosure

Figure 1:
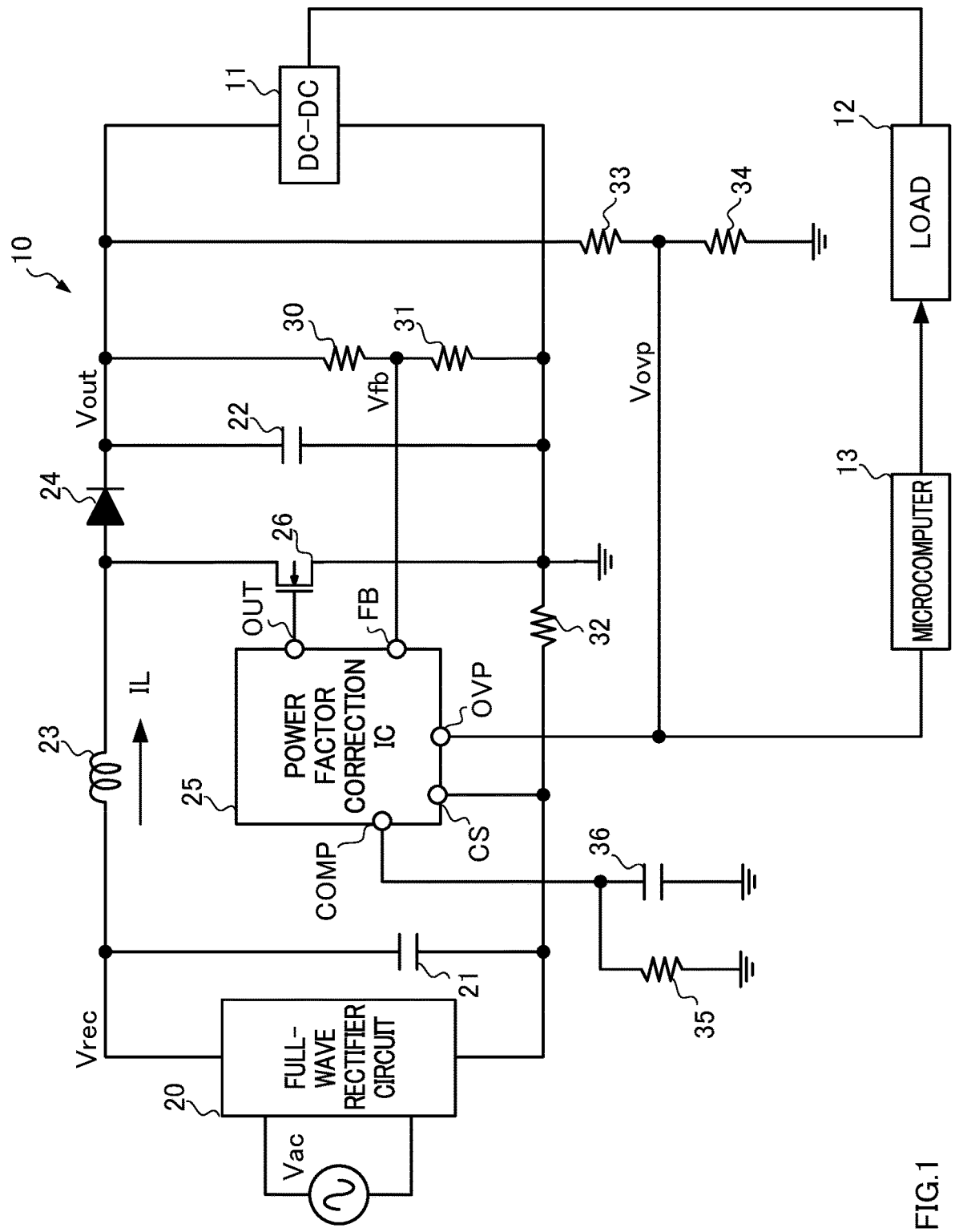
FIG. 1 is a diagram illustrating an example of an AC-DC converter 10.

FIG. 1 is a diagram illustrating a configuration of an AC-DC converter 10 according to an embodiment of the present disclosure. The AC-DC converter 10 is a boost chopper type power supply circuit that generates an output voltage Vout at a target level from an AC voltage Vac of a commercial power supply.

ADC-DC converter 11 is a circuit that generates a voltage suitable for a load 12, from the output voltage Vout which is a direct current (DC) voltage. Note that the load 12 is an electronic device that operates with a DC voltage, for example.

A microcomputer 13 (control circuit), for example, reduces power consumption of the load 12 when the level of a voltage Vovp, which will be described later, rises.

Outline of AC-DC Converter 10

The AC-DC converter 10 includes a full-wave rectifier circuit 20, capacitors 21, 22, and 36, an inductor 23, a diode 24, a power factor correction IC 25, a power transistor 26, and resistors 30 to 35.

The full-wave rectifier circuit 20 full-wave rectifies the predetermined AC voltage Vac input thereto, and outputs the result as a voltage Vrec to the capacitor 21 and the inductor 23. Note that the AC voltage Vac is a voltage having an effective value from 100 V to 240 V and a frequency from 50 Hz to 60 Hz, for example.

The capacitor 21 smoothes the voltage Vrec. The capacitor 22 constitutes a boost chopper circuit together with the inductor 23, the diode 24, and the power transistor 26. Thus, a charging voltage of the capacitor 22 is the DC output voltage Vout. Note that the output voltage Vout is 400 V, for example.

The power factor correction IC 25 is an integrated circuit that controls switching of the power transistor 26 such that the level of the output voltage Vout reaches the target level (for example, 400 V) while improving a power factor of the AC-DC converter 10. Specifically, the power factor correction IC 25 drives the power transistor 26, based on an inductor current IL flowing through the inductor 23 and the output voltage Vout. Note that the power factor correction IC 25 will be described later in detail, and the power factor correction IC 25 is provided with terminals CS, FB, COMP, OVP, and OUT.

The power transistor 26 is an NMOS transistor for controlling power to be applied to the load (which will be described later) of the AC-DC converter 10. In an embodiment of the present disclosure, it is assumed that the power transistor 26 is a metal oxide semiconductor (MOS) transistor, but is not limited thereto. As long as the power transistor 26 is a transistor capable of controlling power, for example, a bipolar transistor or an insulated gate bipolar transistor (IGBT) may be employed. A gate electrode of the power transistor 26 is connected with the terminal OUT.

The resistors 30 and 31 constitute a voltage divider circuit that divides the output voltage Vout, and generates a feedback voltage Vfb to be used in switching the power transistor 26. Note that the feedback voltage Vfb generated at a node at which the resistors 30 and 31 are connected is applied to the terminal FB.

The resistor 32 is a resistor for detecting the inductor current IL, and has one end connected with the source electrode of the power transistor 26 and the other end connected with the terminal CS. Note that, in an embodiment of the present disclosure, a voltage generated at the resistor 32 is given as a voltage Vcs, with a voltage at the grounded source electrode of the power transistor 26 being given as a reference (0 V). Thus, a negative voltage value of the voltage Vcs increases with an increase in the inductor current IL.

The resistors 33 and 34 constitute a voltage divider circuit that divides the output voltage Vout, and generates the voltage Vovp that is used in detecting whether the output voltage Vout is in an overvoltage state. Note that, although details will be described later, the voltage Vovp (divided voltage) generated at the node at which the resistors 33 and 34 are connected is applied to the terminal OVP. Here, the "overvoltage" indicates a state in which the level of the output voltage Vout is at a predetermined level X that is 1.1 times the target level, for example.

Although details will be described later, the resistor 35 and the capacitor 36 are elements for phase compensation of the power factor correction IC 25 that is feedback controlled, and are provided between the terminal COMP and a ground.

Configuration of Power Factor Correction IC 25

Figure 2:
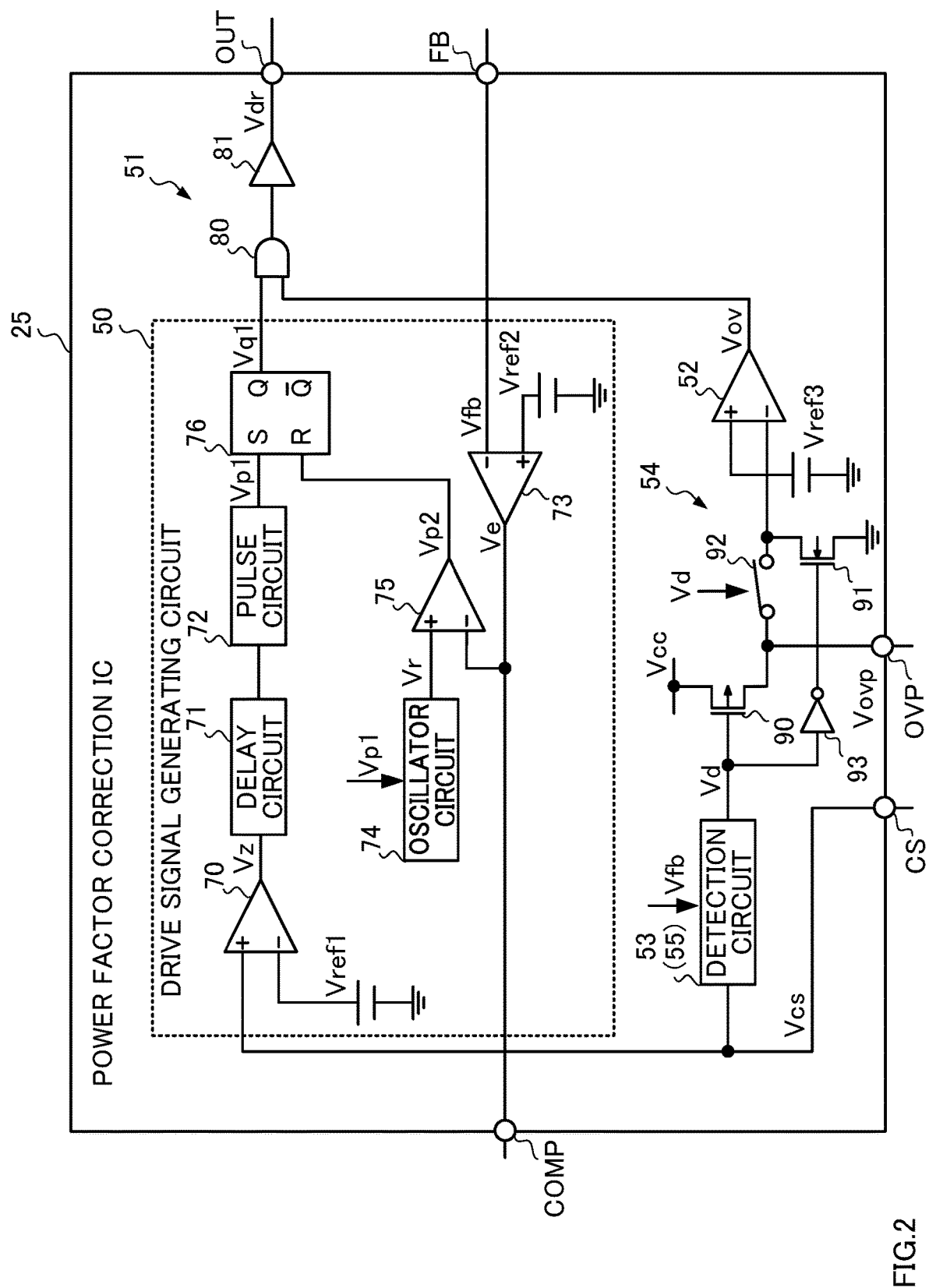
FIG. 2 is a diagram illustrating an example of a power factor correction IC 25.

FIG. 2 is a diagram illustrating an example of a configuration of the power factor correction IC 25. The power factor correction IC 25 includes a drive signal generating circuit 50, a drive circuit 51, a comparator 52, a detection circuit 53, and a voltage switching circuit 54.

The drive signal generating circuit 50 generates a drive signal Vq1 for turning on and off the power transistor 26 based on the voltage Vcs indicative of the inductor current IL and the feedback voltage Vfb. The drive signal generating circuit 50 includes a comparator 70, a delay circuit 71, a pulse circuit 72, an error amplifier circuit 73, an oscillator circuit 74, a comparator 75, and an SR flip flop 76.

The comparator 70 is a circuit that detects whether a current value of the inductor current IL is substantially zero. Specifically, the comparator 70 compares the magnitude between the voltage Vcs to be applied to the terminal CS and a reference voltage Vref1 (e.g., several millivolts) corresponding to a current value slightly larger than zero (e.g., several milliamperes), and detects whether the current value of the inductor current IL is substantially zero (hereinafter, "substantially zero" is simply referred to as zero, for convenience). Although details will be described later, in an embodiment of the present disclosure, when the voltage Vcs is larger than the reference voltage Vref1, the comparator 70 outputs a signal Vz at a high level (hereinafter, referred to as high level or high) indicating that the inductor current IL is zero.

When the comparator 70 outputs the high signal Vz, the delay circuit 71 delays the signal by a predetermined time period and outputs the delayed signal.

When the delay circuit 71 outputs the high signal Vz, the pulse circuit 72 outputs a high pulse signal Vp1.

The error amplifier circuit 73 amplifies an error between the feedback voltage Vfb to be applied to the terminal FB and a predetermined reference voltage Vref2. Note that the reference voltage Vref2 is a voltage determined according to the output voltage Vout at the target level. The resistor 35 and the capacitor 36 for phase compensation are connected between the output of the error amplifier circuit 73 and the ground via the terminal COMP. Here, a voltage at a node at which the output of the error amplifier circuit 73 and the terminal COMP are connected is given as a voltage Ve.

When the pulse signal Vp1 is output, the oscillator circuit 74 outputs a ramp wave Vr having an amplitude that gradually increases.

The comparator 75 compares the magnitude between the voltage Ve and the ramp wave Vr, and outputs a signal Vp2 as a result of the comparison. Here, the voltage Ve is applied to the inverting input terminal of the comparator 75, and the ramp wave Vr is applied to the non-inverting input terminal of the comparator 75. Thus, when the level of the ramp wave Vr is lower than the level of the voltage Ve, the signal Vp2 is at a low level (hereinafter, referred to as low level or low). When the level of the ramp wave Vr is higher than the level of the voltage Ve, the signal Vp2 is at the high level.

The signal Vp1 is input to an S input of the SR flip flop 76, and the signal Vp2 is input to an R input thereof. Thus, the drive signal Vq1, which is a Q output of the SR flip flop 76, goes high, when the signal Vp1 goes high. In contrast, when the signal Vp2 goes high, the drive signal Vq1 goes low.

The drive circuit 51 drives the power transistor 26 in response to the drive signal Vq1, and includes an AND circuit 80 and a buffer circuit 81.

The AND circuit 80 calculates the logical product of the drive signal Vq1 and a signal Vov from the comparator 52, which will be described later, and outputs the logical product to the buffer circuit 81.

The buffer circuit 81 drives the power transistor 26 having a large gate capacitance and/or the like using a signal Vdr at the same logic level as the logic level of the signal input thereto.

The comparator 52 (fourth comparator circuit) is a circuit for detecting whether the output voltage Vout is in an overvoltage state by comparing the voltage Vovp (which will be described later) and a reference voltage Vref3. Incidentally, as described above, the "overvoltage" indicates a state in which, for example, the level of the output voltage Vout is at a predetermined level X (third level) that is 1.1 times the target level. Thus, in an embodiment of the present disclosure, the level of the voltage Vref3 is defined such that the voltage Vovp becomes larger than the reference voltage Vref3 when the output voltage Vout exceeds the predetermined level X.

The detection circuit 53 (signal output circuit) is a circuit for detecting whether the AC voltage Vac is in an interrupted state. Note that the expression "the AC voltage Vac is in an interrupted state" described herein indicates, for example, a state in which the predetermined AC voltage Vac is not supplied to the AC-DC converter 10 and is not input to the full-wave rectifier circuit 20. Note that, although details of the detection circuit 53 will be described later, the detection circuit 53 outputs a low signal Vd (first signal) when detecting that the AC voltage Vac is interrupted. In contrast, the detection circuit 53 outputs the high signal Vd (second signal) when detecting that the AC voltage Vac is not interrupted, in other words, the predetermined AC voltage Vac is supplied to the AC-DC converter 10 and is input to the full-wave rectifier circuit 20.

The voltage switching circuit 54 switches the voltage level of the terminal OVP according to whether the AC voltage Vac is interrupted. The voltage switching circuit 54 includes a PMOS transistor 90, an NMOS transistor 91, a switch 92, and an inverter 93.

The PMOS transistor 90 is a device for pulling up the voltage at the terminal OVP, and has a gate electrode to which the signal Vd is input, a source electrode to which a predetermined voltage Vcc (predetermined voltage) is applied, and a drain electrode connected with the terminal OVP. Note that the level of the voltage Vcc in an embodiment of the present disclosure is higher than the level of the voltage Vref3. Thus, when the voltage Vcc is applied to the terminal OVP, the microcomputer 13 reduces the power consumption of the load 12, as in the state where the output voltage Vout is in an overvoltage state.

The NMOS transistor 91 is a device for pulling down the voltage at the inverting input terminal of the comparator 52, and has a gate electrode to which the signal Vd having been inverted by the inverter 93 is input, a source electrode that is grounded, and a drain electrode connected with the inverting input terminal of the comparator 52.

The switch 92 is a switch for preventing a malfunction of the comparator 52, and is provided between the terminal OVP and the inverting input terminal of the comparator 52. Note that the switch 92 is, for example, an NMOS transistor, a CMOS switch, or the like. Here, the switch 92 is turned off in response to the low signal Vd, and is turned on in response to the high signal Vd.

Thus, when the low signal Vd is output, the level of the voltage at the terminal OVP becomes equivalent to the level of the voltage Vcc. When the high signal Vd is output, the level of the voltage at the terminal OVP becomes equivalent to the level of the voltage Vovp.

Configuration of Detection Circuit 53

Figure 3:
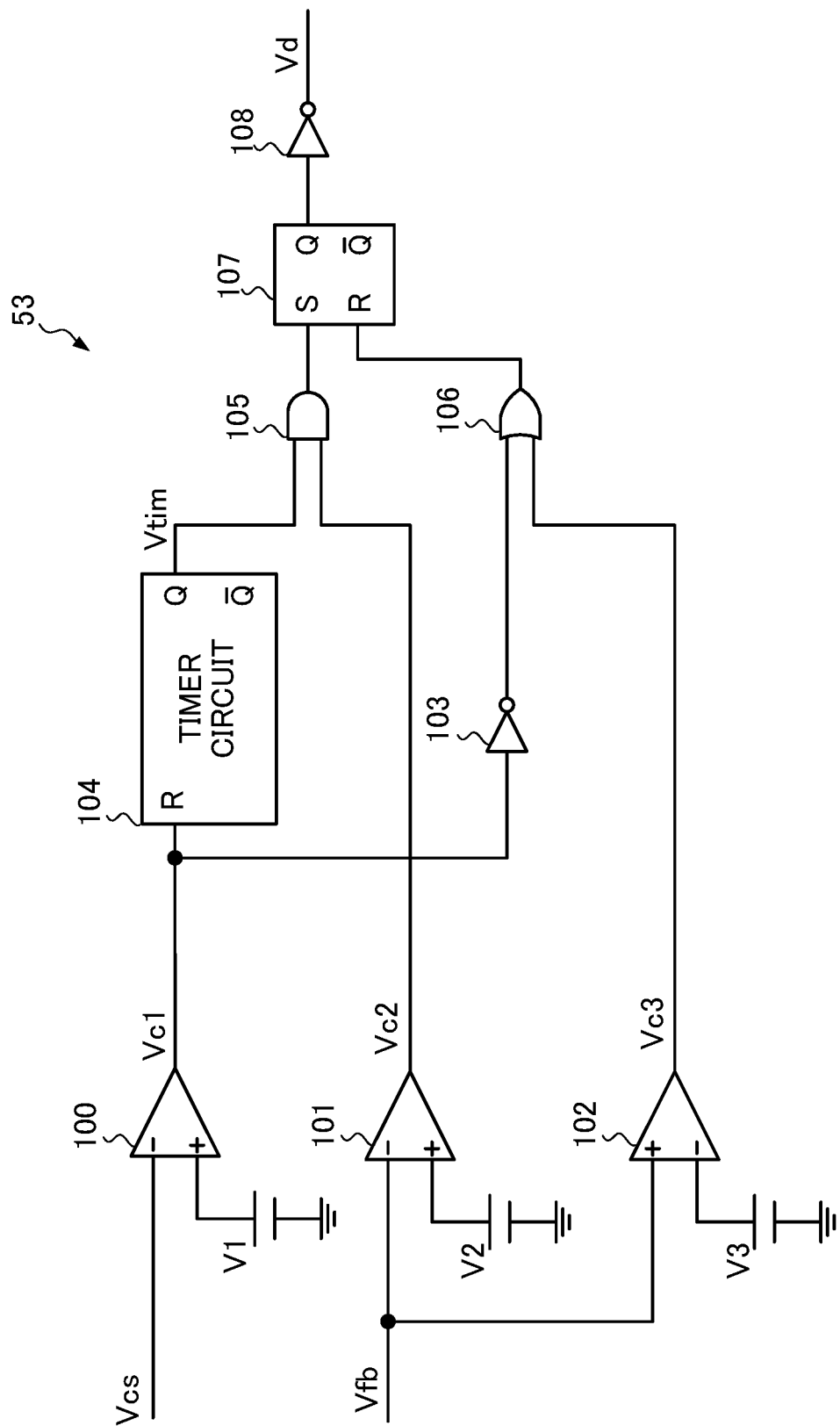
FIG. 3 is a diagram illustrating an example of a detection circuit 53.

As illustrated in FIG. 3, the detection circuit 53 includes comparators 100 to 102, inverters 103 and 108, a timer circuit 104, an AND circuit 105, an OR circuit 106, and an SR flip flop 107.

The comparator 100 (first comparator circuit) is a circuit that compares the current value of the inductor current IL and a current value I1, based on the magnitude relationship between the voltage Vcs and a voltage V1. Here, the "current value I1" is a positive current value close to zero (for example, several ten milliamperes), which is smaller than the average value of the inductor current IL and is larger than the current value detected by the comparator 70, for example. When the current value of the inductor current IL is larger than the current value I1, a signal Vc1, which is output from the comparator 100 as a result of the comparison, goes low. When the current value of the inductor current IL is smaller than the current value I1, the signal Vc1 goes high.

The comparator 101 (second comparator circuit) is a circuit that compares the level of the output voltage Vout and a predetermined level A (first level) which is lower than the target level, based on the magnitude relationship between the feedback voltage Vfb and a voltage V2. Here, the "predetermined level A" is, for example, a level that is 0.9 times the target level. When the level of the output voltage Vout is higher than the predetermined level A, a signal Vc2, which is output from the comparator 101 as a result of the comparison, goes low. When the level of the output voltage Vout is lower than the predetermined level A, the signal Vc2 goes high.

The comparator 102 (third comparator circuit) is a circuit that compares the level of the output voltage Vout and a predetermined level B (second level), based on the magnitude relationship between the feedback voltage Vfb and a voltage V3. Here, the "predetermined level B" is lower than the target level and higher than the predetermined level A, and is, for example, a level that is 0.95 times the target level. When the level of the output voltage Vout is higher than the predetermined level B, a signal Vc3, which is output from the comparator 102 as a result of the comparison, goes high. When the level of the output voltage Vout is lower than the predetermined level B, the signal Vc3 goes low.

The timer circuit 104 measures a time period in which the high signal Vc1 is input to the R input, and resets the measured time period when the low signal Vc1 is input to the R input. In addition, when having measured a predetermined time period T since the time when the high signal Vc1 has been input, the timer circuit 104 changes a signal Vtim, which is output from a Q output, from low to high.

Accordingly, the timer circuit 104 according to an embodiment of the present disclosure measures a time elapsed since the time when the current value of the inductor current IL has become smaller than the current value I1 and the signal Vc1 has gone high.

The AND circuit 105 calculates the logical product of the signal Vtim and the signal Vc2 from the comparator 101, and outputs the logical product to the SR flip flop 107.

The OR circuit 106 calculates the logical sum of the signal Vc1 inverted by the inverter 103 and the signal Vc3 from the comparator 102, and outputs the logical sum to the SR flip flop 107.

The output from the AND circuit 105 is input to an S input of the SR flip flop 107, and the output from the OR circuit 106 is input to an R input. The inverter 108 inverts the logic level of a Q output of the SR flip flop 107, and outputs the result as the signal Vd.

Operation of Power Factor Correction IC 25

Case in which AC Voltage Vac is Input

Figure 4:
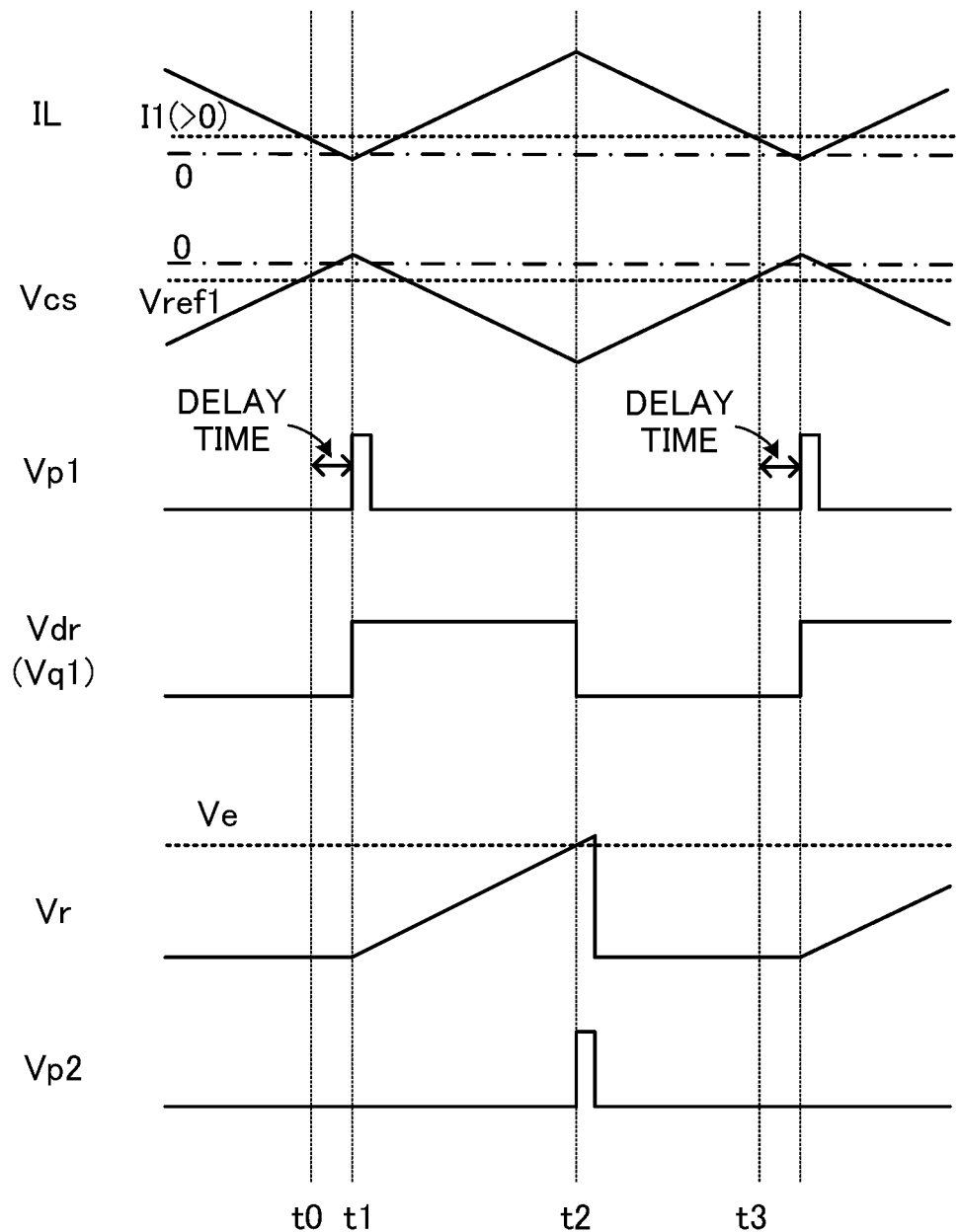
FIG. 4 is a diagram illustrating an operation of an AC-DC converter 10.

With reference to FIG. 4, a description will be given of an operation of the power factor correction IC 25 when the AC-DC converter 10 generates the output voltage Vout at the target level from the predetermined AC voltage Vac and supplies power to a given load.

Here, since the output voltage Vout is at the target level, the comparator 101 outputs a low signal V2 and the comparator 102 outputs the high signal Vc3. Thus, the SR flip flop 107 is in a reset state. Then, since the detection circuit 53 outputs the high signal Vd, the voltage Vovp is applied to the terminal OVP, which is a state capable of detecting an overvoltage.

Incidentally, when the output voltage Vout at the target level is generated, the voltage Vovp is lower than the reference voltage Vref3, and is not in an overvoltage state. Accordingly, the comparator 52 outputs the high signal Vov, and the drive circuit 51 operates in response to the output from the drive signal generating circuit 50.

First, when the inductor current IL decreases to the current value I1 at a time t0, in other words, the voltage Vcs rises to the reference voltage Vref1, the comparator 70 changes the signal Vz to high (not illustrated in FIG. 4). At a time t1, at which a time corresponding to a delay time of the delay circuit 71 has elapsed from the time t0, the pulse circuit 72 outputs the pulse signal Vp1.

Then, when the pulse signal Vp1 is output, the SR flip flop 76 outputs the high drive signal Vq1. Thus, the signal Vdr also goes high. As a result, the power transistor 26 is turned on and the inductor current IL increases.

In addition, when the pulse signal Vp1 is output, the amplitude of the ramp wave Vr from the oscillator circuit 74 increases. Then, when the amplitude level of the ramp wave Vr becomes higher than the level of the voltage Ve at a time t2, the comparator 75 changes the signal Vp2 to high. As a result, the SR flip flop 76 is reset, and the signal Vdr also goes low. When the signal Vdr goes low, the power transistor 26 is turned off. Thus, the inductor current IL gradually decreases. When the inductor current IL decreases to the current value I1 at a time t3, the operation at the time t0 is repeated.

Here, when the AC-DC converter 10 generates the output voltage Vout at the target level from the predetermined AC voltage Vac, and supplies power to the given load, the feedback voltage Vfb is constant. As a result, the voltage Ve output from the error amplifier circuit 73 is also constant, and hence the time period during which the power transistor 26 is ON (for example, the time period from the time t1 to the time t2) is also constant.

Figure 5:
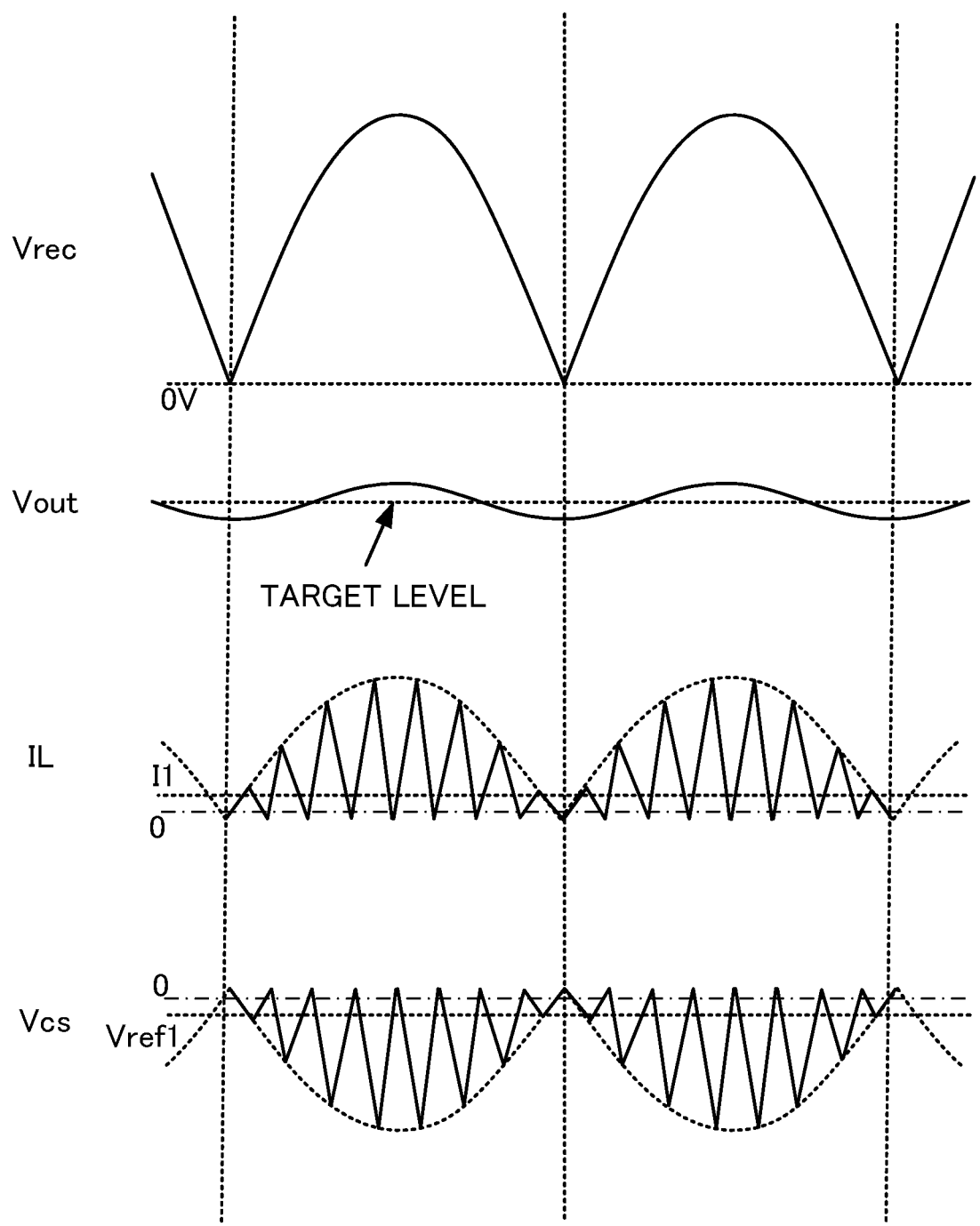
FIG. 5 is a diagram illustrating an operation of an AC-DC converter 10 when an AC voltage is input.

In addition, in a case where the level of the voltage Vrec obtained by rectifying the AC voltage Vac rises when the power transistor 26 is ON, the current value of the inductor current IL also increases. As a result, as illustrated in FIG. 5, the waveform indicating peaks of the inductor current IL is similar to the waveform of the voltage Vrec, thereby improving a power factor. Note that the waveform indicating the peaks of the inductor current IL is similar to the waveform of the voltage Vrec. However, as described above, in the voltage Vcs, a negative voltage value increases with an increase in the inductor current IL. Accordingly, when the level of the voltage Vrec is the highest, the peak of the voltage Vcs is the lowest.

Case in which AC Voltage Vac is Restored after being Interrupted

Figure 6:
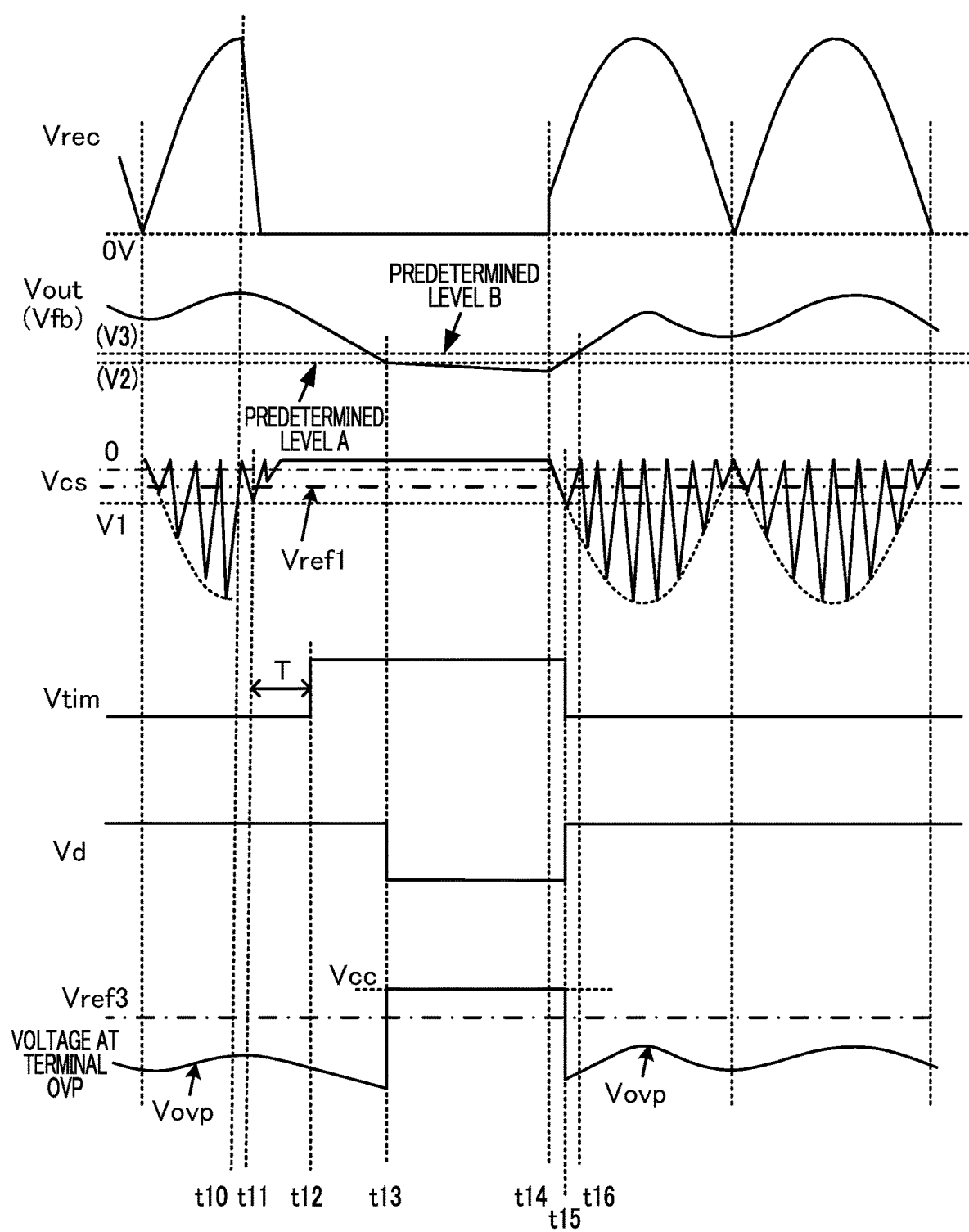
FIG. 6 is a diagram illustrating an operation of an AC-DC converter 10 when an AC voltage is interrupted.

With reference to FIG. 6, a description will be given of an operation of the power factor correction IC 25 when the AC voltage Vac is interrupted. First, when the AC voltage Vac is interrupted at a time t10, the level of the voltage Vrec drops sharply. In association therewith, at a time t11, the current value of the inductor current IL becomes smaller than the current value I1, and thus the level of the voltage Vcs becomes lower than the level of the voltage V1. As a result, the signal Vc1 from the comparator 100 goes high, and the timer circuit 104 starts measuring a time elapsed since the time when the signal Vc1 has gone high.

Then, at a time t12, at which the predetermined time period T has elapsed since the time t11, the timer circuit 104 changes the signal Vtim, which is output from the Q output, to high. Note that the predetermined time period T is, for example, a time period substantially equivalent to approximately ⅛ cycle of the AC voltage Vac, and shorter than a time period of a ½ cycle of the AC voltage Vac.

Also in this period, the AC voltage Vac is interrupted, and hence the output voltage Vout and the feedback voltage Vfb gradually decrease. Then, when the level of the output voltage Vout decreases to the predetermined level A at a time t13, in other words, when the level of the feedback voltage Vfb decreases to the level of a voltage V2, the signal Vc2 from the comparator 101 goes high. As a result, the output from the AND circuit 105 also goes high, and the detection circuit 53 outputs the low signal Vd indicating that the AC voltage Vac is interrupted. Then, when the signal Vd goes low, the voltage at the terminal OVP is pulled up to the voltage Vcc.

Note that when the voltage at the terminal OVP is pulled up at the time t13, the microcomputer 13 reduces the power consumption of the load 12. Thus, at the time t13 and thereafter, the output voltage Vout gradually decreases.

When the AC voltage Vac has been restored at a time t14, the level of the voltage Vrec rises, and the inductor current IL also increases. Then, when the level of the voltage Vcs becomes higher than the level of the voltage V1 at a time t15, time measurement performed by the timer circuit 104 is reset, and the signal Vtim is changed to low. In addition, at this time, since the low signal Vc1 from the comparator 100 is inverted by the inverter 103, the SR flip flop 107 is also reset, and the signal Vd goes high. As a result, a voltage applied to the terminal OVP results in the voltage Vovp, which is a state capable of detecting an overvoltage of the output voltage Vout.

At the time t14 at which the AC voltage Vac has been restored and thereafter, the output voltage Vout also gradually rises. Thus, for example, at a time t16, the level of the output voltage Vout becomes higher than the predetermined level B.

Other Embodiments of Detection Circuit

Figure 7:
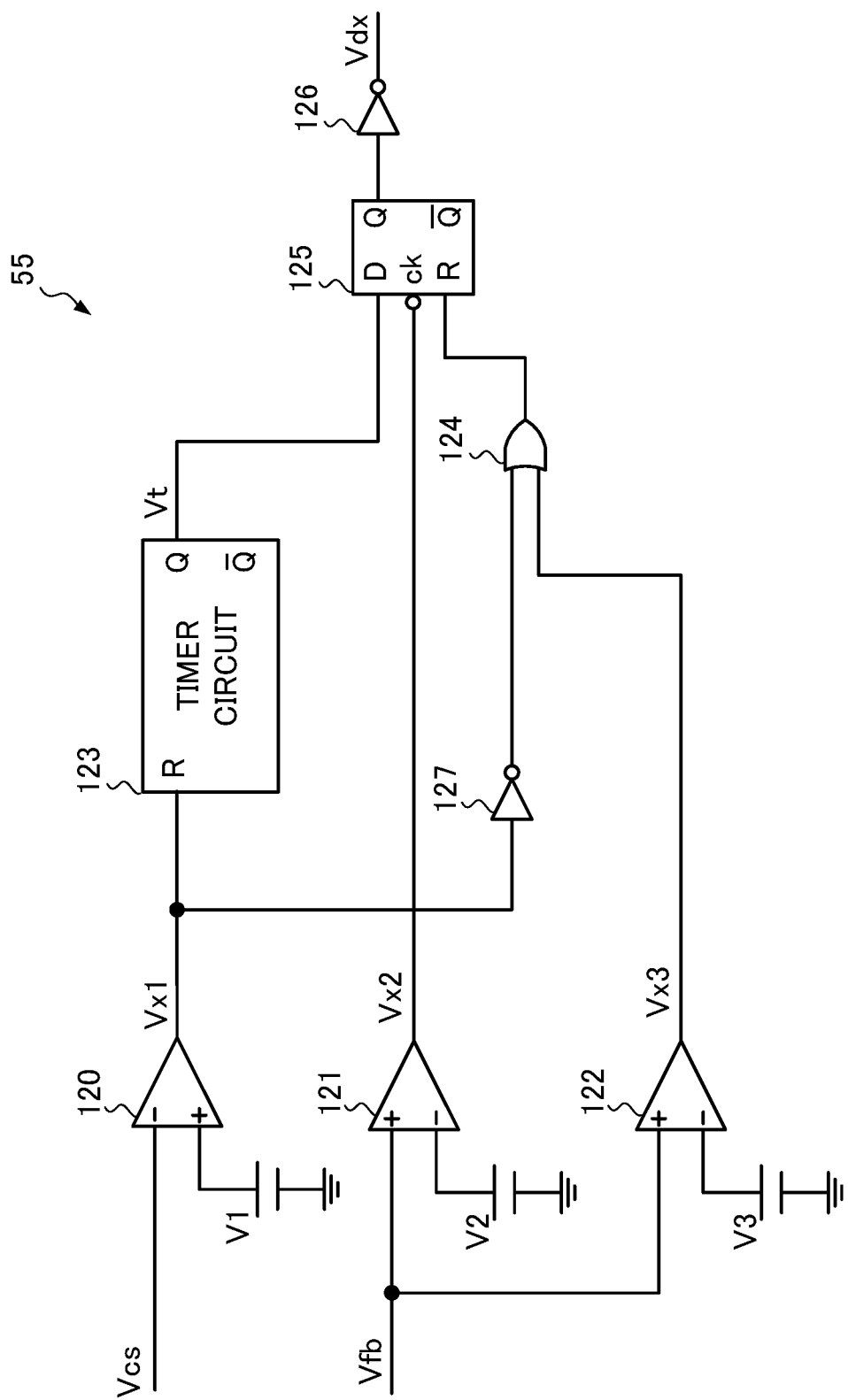
FIG. 7 is a diagram illustrating an example of a detection circuit 55.

FIG. 7 is a diagram illustrating a configuration of a detection circuit 55 that detects whether the AC voltage Vac is in an interrupted state. Similarly to the detection circuit 53, when detecting that the AC voltage Vac is in an interrupted state, the detection circuit 55 outputs a low signal Vdx (first signal). When detecting that the AC voltage Vac is not in the interrupted state, the detection circuit 55 outputs a high signal Vdx (second signal). Note that the current value I1 and the voltage V1 in the detection circuit 55 are similar to the foregoing current value I1 and voltage V1.

The detection circuit 55 (signal output circuit) includes comparators 120 to 122, a timer circuit 123, an OR circuit 124, a D flip flop 125, and inverters 126 and 127.

The comparator 120 (first comparator circuit) is a circuit that compares the current value of the inductor current IL and the current value I1, based on the magnitude relationship between the voltage Vcs and the voltage V1. When the current value of the inductor current IL is larger than the current value I1, a signal Vx1, which is output from the comparator 120 as a result of the comparison, goes low. When the current value of the inductor current IL is smaller than the current value I1, the signal Vx1 goes high.

The comparator 121 (second comparator circuit) is a circuit that compares the level of the output voltage Vout and the predetermined level A (first level) lower than the target level, based on the magnitude relationship between the feedback voltage Vfb and the voltage V2. When the level of the output voltage Vout is higher than the predetermined level A, a signal Vx2, which is output from the comparator 121 as a result of the comparison, goes high. When the level of the output voltage Vout is lower than the predetermined level A, the signal Vx2 goes low.

The comparator 122 (third comparator circuit) is a circuit that compares the level of the output voltage Vout and a predetermined level B (second level), based on a magnitude relationship between the feedback voltage Vfb and a voltage V3. When the level of the output voltage Vout is higher than the predetermined level B, a signal Vx3, which is output from the comparator 122 as a result of the comparison, goes high. When the level of the output voltage Vout is lower than the predetermined level B, the signal Vx3 goes low.

The timer circuit 123 measures a time period in which the high signal is input to the R input, and resets the measured time period when the low signal is input to the R input. In addition, when the time period having been measured since the high signal has been input has reached the predetermined time period T, the timer circuit 123 changes a signal Vt, which is output from the Q output, from low to high. Note that the timer circuit 123 according to an embodiment of the present disclosure measures a time elapsed since the time when the current value of the inductor current IL has become smaller than the current value I1 and the signal Vx1 has gone high.

The OR circuit 124 calculates the logical sum of the signal Vx1 inverted by the inverter 127 and the signal Vx3, and outputs the logical sum to the D flip flop 125.

The signal Vt is input to a D input of the D flip flop 125, the signal Vx2 is input to a ck input, and the output from the OR circuit 124 is input to an R input. The inverter 126 inverts the logic level of the input signal, and outputs the result as the signal Vdx.

Here, when the current value of the inductor current IL is smaller than the current value I1, the signal Vx1 goes high. Then, the high signal Vx1 is output for the predetermined time period T, the timer circuit 123 changes the signal Vt to high. Thus, the high signal is input to the D input of the D flip flop 125. At this time, when the level of the output voltage Vout becomes lower than the predetermined level A, the signal Vx2 goes low. Thus, a Q output of the D flip flop 125 goes high. As a result, the signal Vdx is changed to high. As such, when the inductor current IL is smaller for the predetermined time period T, and the level of the output voltage Vout drops, the detection circuit 55 operates similarly to the detection circuit 53.

In addition, when the level of the output voltage Vout becomes higher than the predetermined level B, or the current value of the inductor current IL is larger than the current value I1, the detection circuit 55 changes the signal Vdx to high. Accordingly, when the level of the output voltage Vout is higher than the predetermined level B, or the current value of the inductor current IL is larger than the current value I1, the detection circuit 55 also operates similarly to the detection circuit 53. Thus, for example, in the power factor correction IC 25, the detection circuit 55 can be used in place of the detection circuit 53.

Summary

The AC-DC converter 10 according to an embodiment of the present disclosure has been described above. The power factor correction IC 25 includes the detection circuit 53 which detects that the AC voltage Vac has been interrupted. Thus, in implementing the AC-DC converter 10, it is not required to configure a circuit for detecting the AC voltage Vac using discrete components and/or the like. Accordingly, with the use of the power factor correction IC 25, the AC-DC converter 10 is capable of detecting that the AC voltage Vac has been interrupted at low cost.

When the AC voltage Vac has been restored after being interrupted, the voltage Vrec rises, and hence the inductor current IL also increases. The detection circuit 53 according to an embodiment of the present disclosure compares the current value of the inductor current IL and the current value I1, thereby detecting that the interrupted AC voltage Vac has been restored. As such, the power factor correction IC 25 is capable of detecting not only interruption but also restoration of the AC voltage Vac.

In addition, when the AC voltage Vac has been restored, the level of the output voltage Vout also raises. When the level of the output voltage Vout is higher than the predetermined level B, the detection circuit 53 detects that the interrupted AC voltage Vac has been restored. As such, the power factor correction IC 25 is capable of detecting restoration of the AC voltage Vac based on not only the inductor current IL but also the output voltage Vout. The predetermined level B is set to be higher than the predetermined level A for detecting that the AC voltage Vac has been interrupted. Specifically, in the levels of the output voltage Vout, the level for detecting restoration and the level for detecting interruption are different from each other. Thus, even when the output voltage Vout fluctuates due to a ripple, noise, and/or the like, the detection circuit 53 is capable of detecting interruption and restoration of the AC voltage Vac with high accuracy.

In addition, when the AC voltage Vac has been interrupted, the voltage switching circuit 54 of the power factor correction IC 25 changes the level of the voltage at the terminal OVP to the level of the voltage Vcc. Thus, a user of the power factor correction IC 25 can figure out that the AC voltage Vac has been interrupted by monitoring the level of the voltage at the terminal OVP.

In addition, in the power factor correction IC 25, when the comparator 52 detects an overvoltage, the power transistor 26 is turned off. Accordingly, the output voltage Vout can be prevented from rising more than necessary.

In addition, when the voltage level at the terminal OVP rises, the microcomputer 13 reduces the power consumption of the load 12. Thus, even if the AC voltage Vac is interrupted and the output voltage Vout of the AC-DC converter 10 drops from the target level, the output voltage Vout can be restored to the target level in a short time.

Embodiment(s) of the present disclosure described above is/are simply for facilitating the understanding of the present disclosure and is/are not in any way to be construed as limiting the present disclosure. The present disclosure may variously be changed or altered without departing from its gist and encompass equivalents thereof.

What is claimed is:

1. An integrated circuit for a power supply circuit that generates an output voltage at a target level from an alternating current (AC) voltage input thereto, the power supply circuit including
   a rectifier circuit that rectifies the AC voltage,
   an inductor that receives a rectified voltage from the rectifier circuit, and
   a transistor that controls an inductor current flowing through the inductor,
the integrated circuit being configured to drive the transistor based on the inductor current and the output voltage, the integrated circuit comprising:
   a signal output circuit that includes
   a first comparator circuit that compares a value of the inductor current and a predetermined current value,
   a timer circuit that measures a time elapsed since the first comparator circuit starts to output a result of the comparison indicating that the value of the inductor current is smaller than the predetermined current value, and
   a second comparator circuit that compares a level of the output voltage and a first level lower than the target level,
the signal output circuit outputting a first signal indicating that the AC voltage is not input to the rectifier circuit, when the elapsed time reaches a predetermined time period and the second comparator circuit outputs a result of the comparison thereof indicating that the level of the output voltage is lower than the first level.

2. The integrated circuit according to claim 1, wherein
when the first comparator circuit outputs a result of the comparison thereof indicating that the value of the inductor current is larger than the predetermined current value, the signal output circuit outputs a second signal indicating that the AC voltage is input to the rectifier circuit.

3. The integrated circuit according to claim 2, wherein the signal output circuit further includes a third comparator circuit that compares the level of the output voltage and a second level that is lower than the target level and higher than the first level, wherein
when the first comparator circuit outputs the result of the comparison thereof indicating that the value of the inductor current is larger than the predetermined current value, or the third comparator circuit outputs a result of the comparison thereof indicating that the level of the output voltage is higher than the second level, the signal output circuit outputs the second signal.

4. The integrated circuit according to claim 3, further comprising:
a terminal;
a voltage switching circuit that switches a voltage level at the terminal, such that the voltage level at the terminal is
a predetermined voltage level when the signal output circuit outputs the first signal, and
a level of a divided voltage obtained by dividing the output voltage when the signal output circuit outputs the second signal; and
a fourth comparator circuit that compares the level of the divided voltage and a level of a reference voltage, which is a third level higher than the target level, when the signal output circuit outputs the second signal, wherein
the predetermined voltage level is higher than the level of the reference voltage.

5. The integrated circuit according to claim 4, further comprising:
a drive signal generating circuit that generates a drive signal for turning on and off the transistor, based on the inductor current and the output voltage; and
a drive circuit that
turns on and off the transistor in response to the drive signal when the level of the divided voltage is lower than the level of the reference voltage, and
turns off the transistor when the level of the divided voltage is higher than the level of the reference voltage.

6. The integrated circuit according to claim 4, wherein the terminal has a control circuit connected thereto, which is configured to reduce power consumption of a load of the power supply circuit, when the voltage level at the terminal is higher than the level of the reference voltage, the load being configured to operate based on the output voltage.

7. A power supply circuit for generating an output voltage at a target level from an alternating current (AC) voltage, the power supply circuit comprising:
a rectifier circuit that rectifies the AC voltage;
an inductor that receives a rectified voltage from the rectifier circuit;
a transistor that controls an inductor current flowing through the inductor; and
an integrated circuit that drives the transistor based on the inductor current and the output voltage, the integrated circuit having a signal output circuit that includes
a first comparator circuit that compares a value of the inductor current and a predetermined current value,
a timer circuit that measures a time elapsed since the first comparator circuit starts to output a result of the comparison thereof indicating that the value of the inductor current is smaller than the predetermined current value, and
a second comparator circuit that compares a level of the output voltage and a predetermined level lower than the target level,
the signal output circuit outputting a signal indicating that the AC voltage is not input to the rectifier circuit, when the elapsed time reaches a predetermined time period and the second comparator circuit outputs a result of the comparison thereof indicating that the level of the output voltage is lower than the predetermined level.

* * * * *